United States Patent [19]

Vaidya et al.

[11] Patent Number: 4,959,605
[45] Date of Patent: Sep. 25, 1990

[54] HYBRID PERMANENT MAGNET AND VARIABLE RELUCTANCE GENERATOR

[75] Inventors: Jayant Vaidya; David J. Belanger, both of Rockford, Ill.

[73] Assignee: Sundstrand Corporation, Rockford, Ill.

[21] Appl. No.: 275,576

[22] Filed: Nov. 23, 1988

[51] Int. Cl.$^5$ ............................................. H02K 21/00
[52] U.S. Cl. .................................... 322/10; 310/156; 310/168
[58] Field of Search .................... 322/8, 10, 28, 29, 32; 310/152, 154, 156, 168

[56] References Cited

U.S. PATENT DOCUMENTS

| | | | |
|---|---|---|---|
| 3,041,486 | 6/1962 | Moffitt | 310/168 |
| 3,062,979 | 11/1962 | Jarret | 310/168 |
| 3,467,844 | 9/1969 | Bird | 310/168 |
| 3,470,408 | 9/1969 | Lewis et al. | 310/168 |
| 3,594,595 | 7/1971 | Williams et al. | 310/168 |
| 3,700,944 | 10/1972 | Heintz | 310/168 |
| 3,760,205 | 9/1973 | Imris | 310/168 |
| 4,096,624 | 6/1978 | Gray et al. | 29/596 |
| 4,481,459 | 11/1984 | Mehl et al. | 322/10 |
| 4,587,436 | 5/1986 | Cronin | 322/8 X |
| 4,625,160 | 11/1986 | Hucker | 322/32 |
| 4,639,626 | 1/1987 | McGee | 310/155 |
| 4,656,379 | 4/1987 | McCarty | 310/156-X |
| 4,684,873 | 8/1987 | Glennon | 322/47 |
| 4,830,412 | 5/1989 | Raad et al. | 322/10 X |

*Primary Examiner*—Steven L. Stephan
*Assistant Examiner*—Kristine L. Peckman
*Attorney, Agent, or Firm*—Antonelli, Terry, Stout & Kraus

[57] ABSTRACT

A hybrid electrical generator (20) is disclosed. The hybrid electrical generator has a permanent magnet generator (22) having a permanent magnet rotor (32) mounted on a shaft (26) with the permanent magnet generator providing an output voltage over an operating range which falls in response to an increasing electrical load. The hybrid electrical generator has a variable reluctance generator (24) having a rotor (34) mounted on the shaft with excitation of a stator (30) being provided by the permanent magnet generator. The variable reluctance generator provides an output voltage which varies in response to an increasing load over an operating range. A voltage regulator, responsive to the electrical outputs of the generators, controls the output voltage of the variable reluctance generator to provide a regulated output voltage which is substantially constant independent of electrical load over an operating range.

26 Claims, 6 Drawing Sheets

HYBRID PERMANENT MAGNET AND VARIABLE RELUCTANCE GENERATOR

DESCRIPTION

1. Technical Field

The present invention relates to lightweight high output electrical power generators. More particularly, the present invention relates to electric power generators of the foregoing type for use in aerospace applications, such as airframes.

2. Background Art

Wound rotor synchronous generators are in use for electric power generation in aerospace applications. The speed at which the rotor may be rotated is limited due to the lack of mechanical strength in the rotor windings. This in turn limits the weight reduction of the generator because the weight of the rotor is inversely proportional to the maximum rotor velocity. This limitation of the operational speed of the wound rotor limits the power output of the generator.

Permanent magnet (PM) rotor synchronous generators are also in use for generation of electrical power in aerospace applications. However, the output voltage of a permanent magnet synchronous generator may not be easily regulated which makes it extremely difficult to obtain a flat regulation. Therefore, even though permanent magnet rotor synchronous generators are operational at high rotor speeds and are efficient because no excitation power is required for the rotor, they are not considered to be suitable for usage in airframes as a consequence of their poor regulation characteristic.

HTL, Inc. of California markets a hybrid power generator comprised of permanent magnet generator and a homopolar generator. The output voltage is produced by adding the output voltage produced by the permanent magnet generator and the homopolar generator. The response characteristic of this hybrid generator is flat as a function of electrical load. However, homopolar generators have a disadvantage in that they are relatively heavy and are also relatively inefficient as compared to variable reluctance generators.

U.S. Pat. No. 4,625,160, which is assigned to the assignee of the present invention, discloses a variable speed constant frequency generating system having a permanent magnet generator, a wound field exciter and a main generator mounted on a single driven shaft. Power for voltage and frequency control is derived from the permanent magnet generator. Excitation of the stator windings in the main generator is derived from the wound field exciter.

Variable reluctance electrical generators are known. Examples of variable reluctance generators are disclosed in U.S. Pat. Nos. 3,041,486, 3,062,979, 3,467,844, 3,470,408, 3,700,944, 3,760,205, 4,096,624 and 4,639,626.

DISCLOSURE OF INVENTION

The present invention provides a hybrid permanent magnet variable reluctance generator having a flat voltage to electrical load characteristic over an electrical load range useful for applications in airframes. The present invention permits choosing of the output voltage characteristic of the permanent magnet generator with respect to the desired regulated output voltage of the hybrid generator to provide maximum generating efficiency or maximum power output with the smallest possible weight. The output voltage of the hybrid generator in accordance with the present invention is the sum of the output voltages produced by the variable reluctance generator and the permanent magnet generator. A substantially constant regulated output voltage is produced by a voltage regulator which regulates the output voltage generated by the variable reluctance generator. The output voltage of the permanent magnet generator is unregulated with no attempt being made to secure a regulated output voltage given the difficulty encountered with regulating the output voltage of permanent magnet generators in the prior art.

The hybrid generator of the present invention utilizing a permanent magnet generator and a variable reluctance generator is suitable for applications having high rotor speeds such as those obtained by a power take off from a propulsion engine of an airframe. Furthermore, the rotor structure of the present invention, which has the rotors of the variable reluctance generator and the permanent magnet generator mounted on a common shaft, is simplified as a consequence of no windings being required for the rotors of either generator. As a consequence, high rotational velocity may be utilized in driving the common rotors of the variable reluctance and permanent magnet generators to produce a high energy output which is of particular significance in airframes where a maximum output power per pound is of extreme importance. The hybrid generator of the present invention is particularly useful in a variable speed constant frequency system (VSCF) in which alternating current is rectified and used to power an inverter to produce a regulated three phase output of a constant frequency.

The permanent magnet generator of the present invention performs two important functions. First, it provides excitation for the variable reluctance generator. Second, the output voltage is added to the output voltage of the regulated variable reluctance generator to produce a constant regulated output voltage independent of electrical load which is of particular utility in airframes where significant variations in output power are drawn from the on-board electrical generators from time to time.

A hybrid electrical generator in accordance with the present invention includes a permanent magnet generator having a permanent magnet rotor mounted on a shaft, the permanent magnet generator providing an output voltage over an operating range which falls in response to an increasing electrical load; a variable reluctance generator having a rotor mounted on the shaft with excitation of a stator of the variable reluctance generator being provided by the permanent magnet generator, the variable reluctance generator providing an output voltage which varies in response to an increasing electrical load over an operating range and; a voltage regulator, responsive to combined output voltages of the generators, for controlling the output voltage produced by the variable reluctance generator to cause the hybrid generator to produce a regulated output voltage which is substantially constant independent of variation of an applied electrical load coupled to the hybrid generator over an operating range.

The voltage regulator produces a variable excitation which is applied to the stator of the variable reluctance generator to vary the output voltage of the variable reluctance generator such that the sum of the output voltages of the generator is substantially constant independent of variation of the applied electrical load. The voltage regulator includes an error voltage generator which is responsive to the combined output voltages and a reference voltage for producing an error voltage; an amplifier for amplifying the error voltage to produce the variable, the variable excitation being applied to an excitation winding of the variable reluctance generator to vary the output voltage of the variable reluctance generator.

The present invention provides for either optimization of efficiency in generating the output voltage or maximizing electrical power generated for a particular electrical load with the hybrid generator having minimum weight. When the hybrid electrical generator is operated to produce maximum electrical power at a selected electrical load with the hybrid generator having minimum weight, a maximum output voltage produced by the permanent magnet generator as a function of electrical load is above the regulated output voltage, continually falls as a function of increasing electrical load from the maximum output voltage to a voltage substantially equal to the regulated output voltage at a selected electrical load and to a voltage below the regulated output voltage at electrical loads greater than the selected electrical loads and the output voltage of the variable reluctance generator as a function of electrical load is variable in magnitude from above the regulated output voltage to the regulated output voltage to oppose the voltage generated by the permanent magnet generator and from the regulated output voltage to below the regulated output voltage to add to the voltage generated by the permanent magnet generator. When the hybrid electrical generator is operated to generate electrical power at maximum efficiency, a maximum output voltage produced by the permanent magnet generator as a function of electrical load is substantially equal to the regulated output voltage and continually falls as a function of increasing electrical load and the output voltage of the variable reluctance generator as a function of electrical load is variable to add to the voltage generated by the permanent magnet generator.

A hybrid generator further in accordance with the present invention includes a rectifier bridge, coupled to the permanent magnet generator, for providing a DC voltage from the output voltage of the permanent magnet generator and; an exciter coil for varying excitation to the variable reluctance generator, under control of the voltage regulator in response to the DC voltage.

The variable reluctance generator and the permanent magnet generator may have common stator windings or separate stator windings. The common windings may be distributed or non-distributed.

An output DC potential may be provided by a rectifier bridge coupled to the sum of the output voltages of the generators for providing a rectified DC output. Alternatively, a first rectifier bridge may be coupled to the output voltage of the variable reluctance generator for producing a first rectified output voltage; a second rectifier bridge may be coupled to the output voltage of the permanent magnet generator for producing a second rectified output voltage and a summer may be provided for adding the first and second rectified output voltages together to produce the regulated output voltage.

BEST MODE FOR CARRYING OUT THE INVENTION

Figure 1:
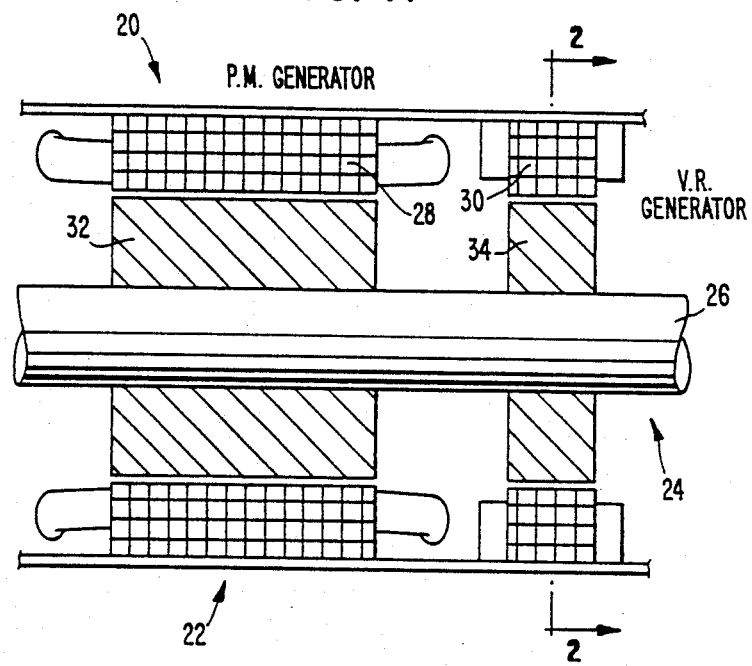
FIG. 1 illustrates a first embodiment of the present invention having a permanent magnet generator and a variable reluctance generator with the rotors mounted on a common shaft.

FIG. 1 illustrates a first embodiment 20 of the present invention which has a permanent magnet generator 22 and a variable reluctance generator 24 of conventional design mounted on a common shaft 26. The permanent magnet generator 22 and the variable reluctance generator 24 have separated stator windings 28 and 30. The shaft 26 may be driven by a high speed source such as an output shaft from a propulsion engine of an airframe. Permanent magnet generator 22 has a permanent magnet rotor 32 and the variable reluctance generator 24 has a rotor 34 which varies the magnetic flux linkage with the stator windings 30 to produce alternating current. The designs of the permanent magnet generator 22 and the variable reluctance generator 24 may be of any known design.

Figure 2:
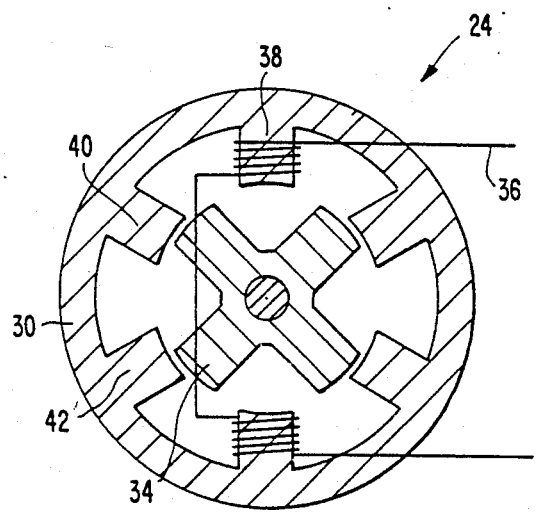
FIG. 2 illustrates a sectional view of the variable reluctance portion of FIG. 1 illustrating an output winding for producing a regulated AC output voltage.

FIG. 2 illustrates a sectional view of the variable reluctance generator 24. A single phase winding 36 is shown mounted on a pair of opposed poles. Single phase alternating current is outputted on the winding 36 which has a frequency directly proportional to the rotational velocity of the rotor 34. As illustrated, the windings 36 are wound around opposed pole pair 38 to produce a single phase output. Similarly, windings identical to winding 36 may be wrapped around opposed pole pairs 40 and 42 to produce two additional output phases. The windings necessary to produce a three phase output have been omitted for purposes of clarity.

Figure 3:
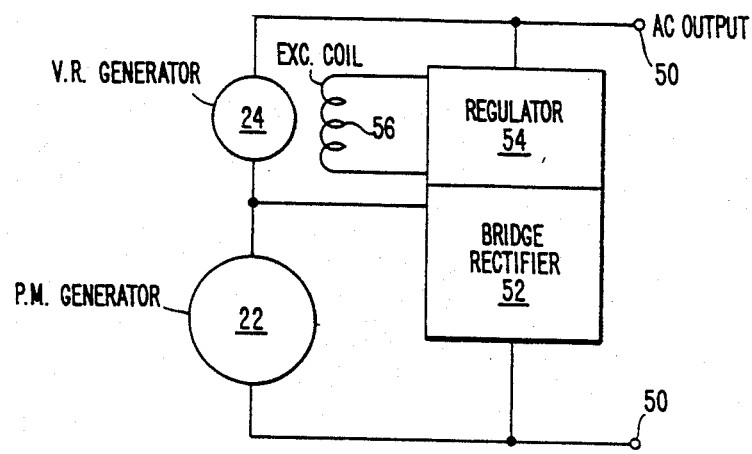
FIG. 3 illustrates a block diagram of the embodiment of FIG. 1.
Figure 5:
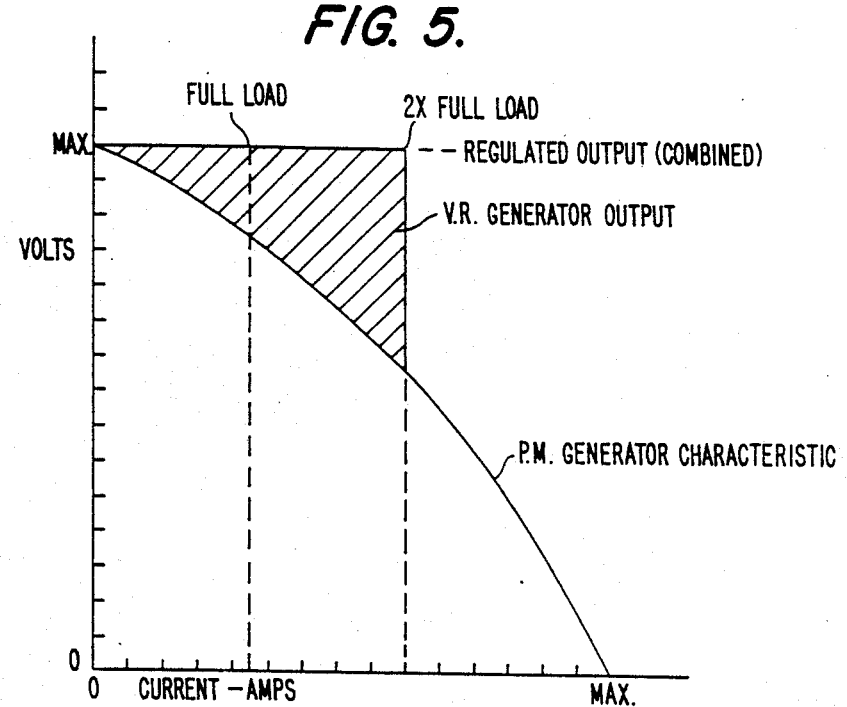
FIG. 5 illustrates a voltage versus electrical load characteristic produced by an embodiment of the present invention which is designed to provide maximum efficiency in generating electrical power.
Figure 6:
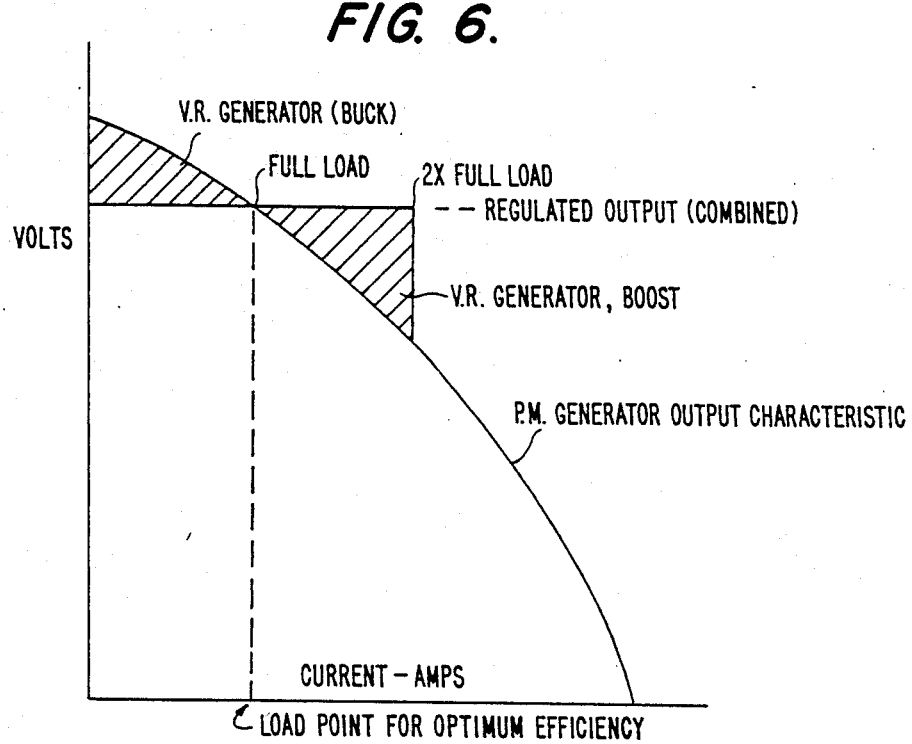
FIG. 6 illustrates an embodiment of the present invention which is designed to generate maximum power with the hybrid generator having minimum weight.

FIG. 3 illustrates a block diagram of the embodiment of FIG. 1. Like reference numerals identify like parts. As illustrated, a regulated AC output is produced on output terminals 50. The permanent magnet generator 22 provides an output voltage which is rectified by bridge rectifier 52 which provides power to voltage regulator 54. The regulator 54 produces a variable excitation which is applied to exciter coil 56 to vary the output voltage from the variable reluctance generator 24. Variation of the output voltage of the variable reluctance generator 24 varies the summed output voltages from the permanent magnet generator 22 and the variable reluctance generator 24 to produce the regulated AC output voltage 50 as illustrated in FIGS. 5 and 6. The embodiment of the regulator 54 is described below with reference to FIG. 4.

Figure 4:
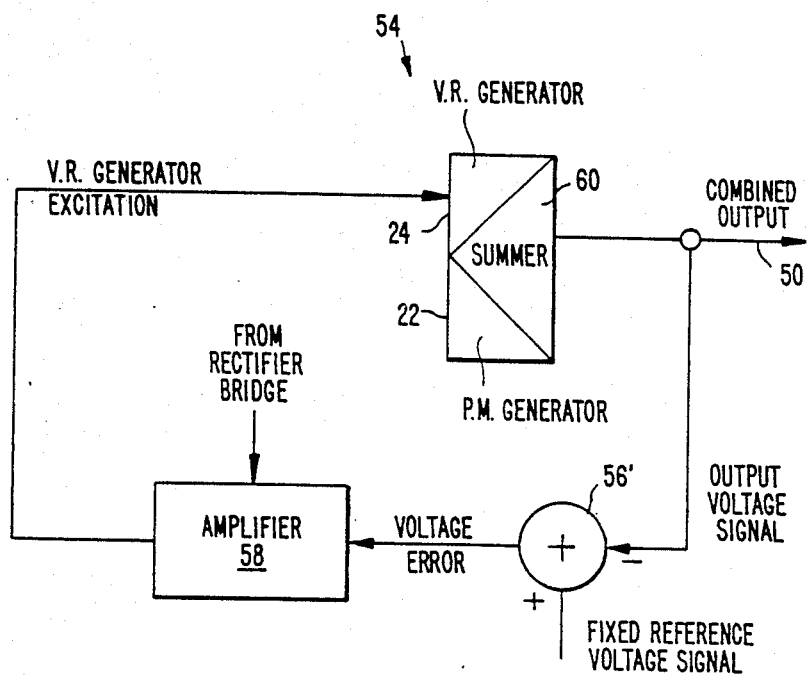
FIG. 4 illustrates a block diagram of the regulator of FIG. 3.

FIG. 4 illustrates an embodiment of a regulator 54 which may be utilized in practicing the invention. However, it should be understood that other forms of voltage regulators may be used with equal facility in practicing the present invention. The voltage regulator 54 is comprised of a voltage error generator 56' which produces an output which is equal to the difference between the output voltage 50 of the hybrid generator and fixed reference voltage signal which the regulated output voltage is to follow, an amplifier 58 which amplifies the voltage error to produce a variable reluctance generator excitation which is applied to the exciter coil 56 of the variable reluctance generator 24 to control its output voltage. A summer 60 sums the voltages from the permanent magnet generator 22 and the variable reluctance generator 24 by connecting the two generators in series across the output as illustrated in FIG. 3.

FIG. 5 illustrates a voltage versus electrical load characteristic which may be achieved with the present invention in which the hybrid generator of the present invention has minimum weight. The response characteristic of FIG. 5 utilizes the characteristic of the variable reluctance generator being less efficient in generating electrical power than the permanent magnet generator. Thus, the maximum output voltage of the permanent magnet generator is chosen to be substantially equal to the regulated output voltage of the hybrid generator at no load with the deficiency in the output voltage of the permanent magnet generator in response to increasing electrical loads being made up by the increasing output voltage generated by the variable reluctance generator 24 as the electrical load increases. As illustrated, the regulated output voltage is substantially constant throughout a load range which is twice the maximum steady state electrical load which may be driven by the electrical generator. Electrical generators in airframes are rated such that they must be able to produce twice their steady state rated electrical power under peak power demand periods. As illustrated, the greater the electrical load, the greater the electrical power which is generated by the variable reluctance generator as identified by the cross-hatched portion of the response characteristic which is disposed above the curve labelled "PM GENERATOR CHARACTERISTIC".

FIG. 6 illustrates a regulated output voltage versus electrical load characteristic of the present invention which is designed for providing maximum electrical power generation efficiency at a selected load point such as the steady state maximum rated load of electrical generators in airframes as discussed above with reference to FIG. 5. The cross-hatched area to the left of the "full load" vertical line is an area where the variable reluctance generator is operated as a bucking generator to subtract output voltage from the voltage produced by the permanent magnet generator as identified by the curve labeled "PM GENERATOR OUTPUT CHARACTERISTIC". The area to the right of the "full load" vertical line is the area where the variable reluctance generator 24 applies additive voltage to produce the combined substantially constant regulated output voltage of the hybrid generator in accordance with the present invention.

Figure 7:
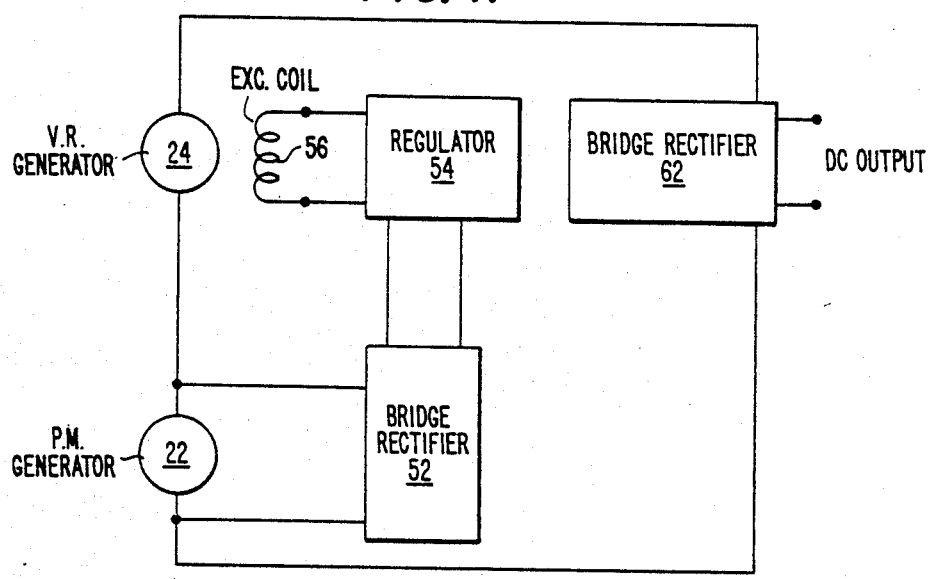
FIG. 7 illustrates a block diagram of an embodiment of the invention for producing regulated DC output.

FIG. 7 illustrates an embodiment of the present invention for producing a regulated DC output voltage. Like reference numerals identify like parts in FIGS. 3 and 7. The embodiment of FIG. 7 is similar to the embodiment of FIG. 3 except that a bridge rectifier 62 is coupled to the sum of the output voltage produced by the permanent magnet generator 22 and the variable reluctance generator 24 to rectify the alternating current to produce a regulated DC output.

Figure 8:
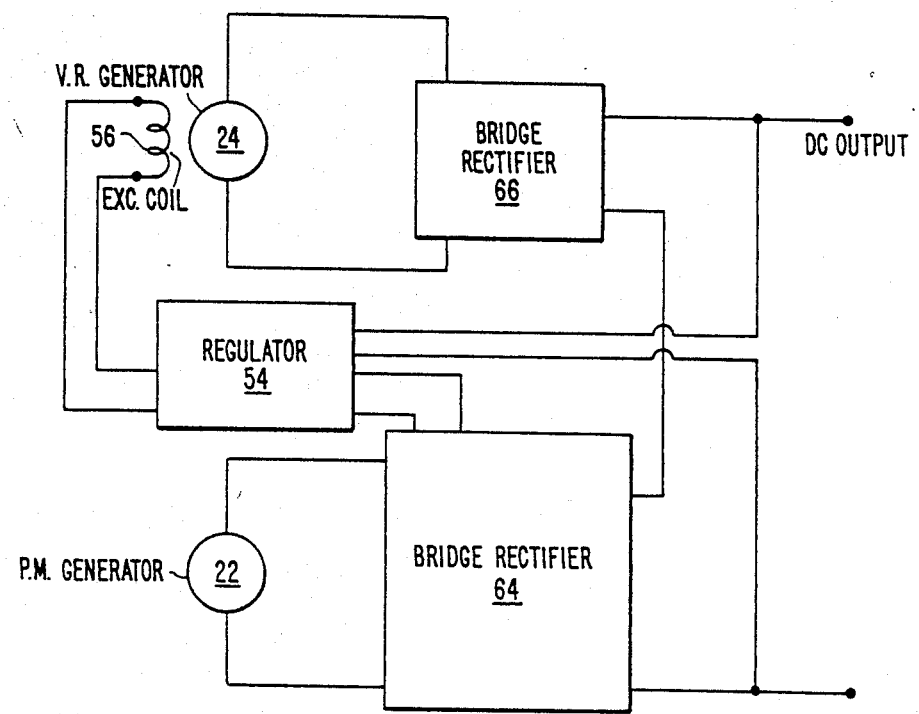
FIG. 8 illustrates another embodiment of the invention for providing regulated DC output with the output voltage being produced by separate bridge rectifiers for respectively rectifying output voltage produced by the variable reluctance generator and the permanent magnet generator.

FIG. 8 illustrates another embodiment of the present invention for producing a regulated DC output voltage. Like reference numerals identify like parts in FIGS. 3, 7 and 8. The embodiment of FIG. 8 differs from the embodiment of FIG. 7 in that the output voltage of the permanent magnet generator 22 is rectified by bridge rectifier 64 and the output voltage of variable reluctance generator 24 is rectified by the bridge rectifier 66 which output voltages are summed to produce the DC regulated output voltage.

Figure 9:
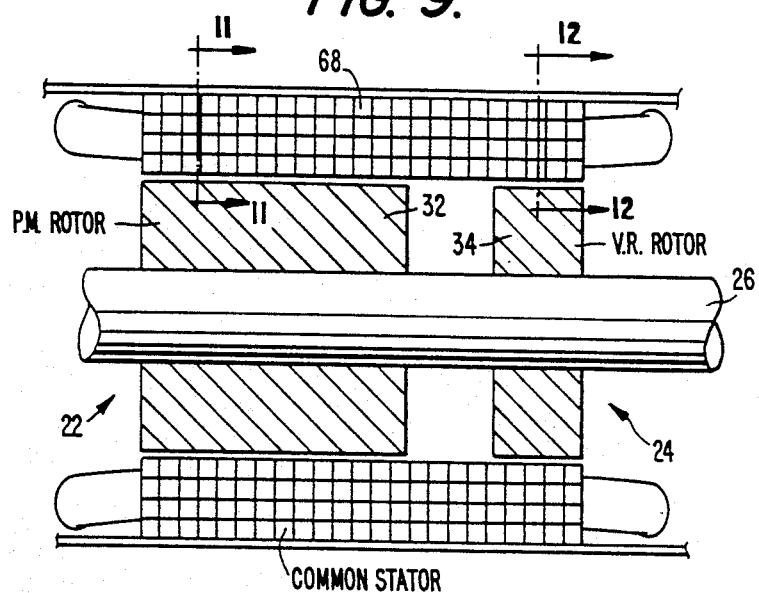
FIG. 9 illustrates an embodiment of the invention having a common stator for both the permanent magnet and variable reluctance generator.

FIG. 9 illustrates another embodiment of the present invention in which a single stator 68 is common to the permanent magnet generator 22 and the variable reluctance generator 24. Like reference numerals identify like parts in FIGS. 1 and 9. The embodiments of FIGS. 1 and 9 are identical with the exception of the presence of a common stator 68 in the embodiment of FIG. 9.

Figure 10:
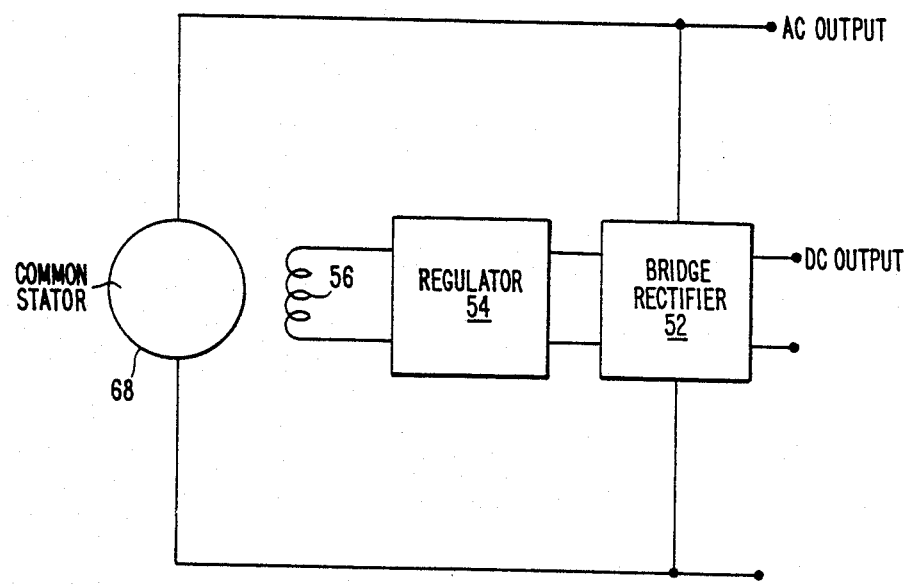
FIG. 10 illustrates a block diagram of the embodiment of FIG. 9.

FIG. 10 illustrates a block diagram of the embodiment of FIG. 9. The AC output voltage is developed across the common stator 68. Like reference numerals identify like parts in FIGS. 3 and 10. Exciter coil 56 excites the portion of the common stator 68 which is associated with the variable reluctance generator 24 (not illustrated).

Figure 11:
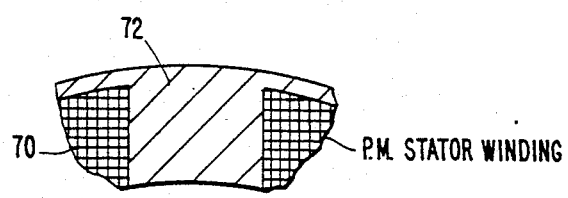
FIG. 11 is a sectional view of the permanent magnet generator of FIG. 9.

FIG. 11 illustrates the sectional view of the permanent magnet generator 22 of FIG. 9 with a non-distributed winding 70 wrapped around an individual pole 72. It should be understood that the remaining poles (not illustrated) of the stator have distributed windings identical to those illustrated in FIG. 11.

Figure 12:
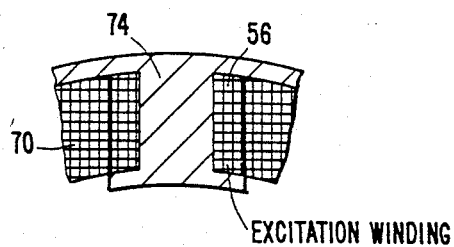
FIG. 12 is a sectional view of the variable reluctance generator of FIG. 9.

FIG. 12 illustrates a sectional view of the stator of the variable reluctance generator 24 with non-distributed windings. Each pole 74 has an inner excitation winding 56 and an outer stator winding 70. It should be understood that the remaining poles (not illustrated) are wrapped with an excitation winding 56 and a stator winding 70 as illustrated in FIG. 12.

Figure 13:
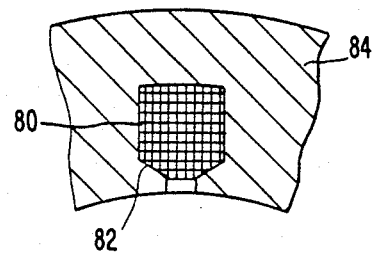
FIG. 13 is a sectional view of an alternative form of winding the stator for the permanent magnet rotor.

FIG. 13 illustrates a distributed stator winding for use with the embodiment illustrated in FIG. 9. The distributed winding 80 is located in a slot 82 of the stator 84 of the permanent magnet generator 22.

Figure 14:
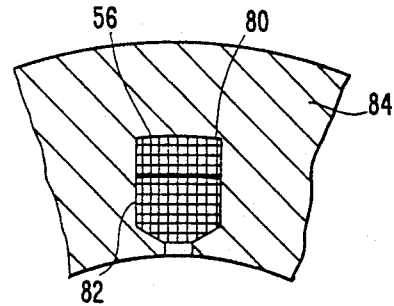
FIG. 14 is an alternative embodiment of winding of the stator for the variable reluctance generator.

FIG. 14 illustrates another embodiment of the stator windings of the variable reluctance generator of FIG. 9 with a distributed excitation winding 56 and a distributed stator winding 82 which are contained in slot 80 of stator 84.

While the invention has been described in terms of its preferred embodiments, it should be understood that numerous modifications may be made thereto without departing from the spirit and scope of the invention as defined in the appended claims. It is intended that all such modifications fall within the scope of the appended claims.

We claim:

1. A hybrid electrical generator comprising:
   a permanent magnet generator having a permanent magnet rotor mounted on a shaft, the permanent magnet generator providing an output voltage over an operating range which falls in response to an increasing electrical load;
   a variable reluctance generator having a rotor mounted on the shaft with excitation of a stator of the variable reluctance generator being provided from the permanent magnet generator, the variable reluctance generator providing an output voltage which varies in response to an increasing electrical load over an operating range; and
   a voltage regulator, responsive to combined output voltages of the generators, for controlling the output voltage provided by the variable reluctance generator to cause the hybrid generator to produce a regulated output voltage which is substantially constant independent of variation of an applied electrical load coupled to the hybrid generator output over an operating range.

2. A hybrid electrical generator in accordance with claim 1 wherein:
   the voltage regulator produces a variable excitation which is applied to the stator of the variable reluctance generator to vary the output voltage of the variable reluctance generator such that the sum of the output voltages of the generator is substantially constant independent of the applied electrical load.

3. A hybrid electrical generator in accordance with claim 2 wherein the voltage regulator comprises:
   means, responsive to the combined output voltages and a reference voltage for producing an error voltage; and
   an amplifier for amplifying the error voltage to produce the variable excitation, the variable excitation being applied to an excitation winding of the variable reluctance generator to vary the output voltage of the variable reluctance generator.

4. A hybrid electrical generator in accordance with claim 2 wherein:
   a maximum output voltage, which is produced by the permanent magnet generator as a function of electrical load and is above the regulated output voltage, continually falls as a function of increasing electrical load from the maximum output voltage to a voltage substantially equal to the regulated output voltage at a selected electrical load and to a voltage below the regulated output voltage at electrical loads greater than the selected electrical load; and
   the output voltage of the variable reluctance generator as a function of electrical load is variable in magnitude from above the regulated output voltage to the regulated output voltage to oppose the output voltage generated by the permanent magnet generator and from the regulated output voltage to below the regulated output voltage to add to the output voltage generated by the permanent magnet generator.

5. A hybrid electrical generator in accordance with claim 2 wherein:
   a maximum output voltage produced by the permanent magnet generator as a function of electrical load is substantially equal to the regulated output voltage and continually falls as a function of increasing electrical load; and
   the output voltage of the variable reluctance generator as a function of electrical load is variable to add to the voltage generated by the permanent magnet generator.

6. A hybrid electrical generator in accordance with claim 3 wherein:
   a maximum output voltage, which is produced by the permanent magnet generator as a function of electrical load and is above the regulated output voltage, continually falls as a function of increasing electrical load from the maximum output voltage to a voltage substantially equal to the regulated output voltage at a selected electrical load and to a voltage below the regulated output voltage at electrical loads greater than the selected electrical load; and
   the output voltage of the variable reluctance generator as a function of electrical load is variable in magnitude from above the regulated output voltage to the regulated output voltage to oppose the output voltage generated by the permanent magnet generator and from the regulated output voltage to below the regulated output voltage to add to the output voltage generated by the permanent magnet generator.

7. A hybrid electrical generator in accordance with claim 3 wherein:
   a maximum output voltage produced by the permanent magnet generator as a function of electrical load is substantially equal to the regulated output voltage and continually falls as a function of increasing electrical load; and
   the output voltage of the variable reluctance generator as a function of electrical load is variable to add to the voltage generated by the permanent magnet generator.

8. A hybrid electrical generator in accordance with claim 1 further comprising:
   a rectifier bridge, coupled to the permanent magnet generator, for providing a DC voltage from the output voltage of the permanent magnet generator; and
   an exciter coil for varying excitation of the variable reluctance generator under control of the voltage regulator in response to the DC voltage.

9. A hybrid electrical generator in accordance with claim 2 further comprising:
   a rectifier bridge, coupled to the permanent magnet generator, for providing a DC voltage from the output voltage of the permanent magnet generator; and
   an exciter coil for applying the variable excitation to the variable reluctance generator under control of the voltage regulator in response to the DC voltage.

10. A hybrid electrical generator in accordance with claim 3 further comprising:
    a rectifier bridge, coupled to the permanent magnet generator, for providing a DC voltage from the output voltage of the permanent magnet generator; and
    an exciter coil for applying the variable excitation to the variable reluctance generator under control of the voltage regulator in response to the DC voltage.

11. A hybrid electrical generator in accordance with claim 4 further comprising:
a rectifier bridge, coupled to the permanent magnet generator, for providing a DC voltage from the output voltage of the permanent magnet generator; and
an exciter coil for applying the variable excitation to the variable reluctance generator under control of the voltage regulator in response to the DC voltage.

12. A hybrid electrical generator in accordance with claim 5 further comprising:
a rectifier bridge, coupled to the permanent magnet generator, for providing a DC voltage from the output voltage of the permanent magnet generator; and
an exciter coil for applying the variable excitation to the variable reluctance generator under control of the voltage regulator in response to the DC voltage.

13. A hybrid electrical generator in accordance with claim 1 wherein:
the variable reluctance generator and the permanent magnet generator have common stator windings.

14. A hybrid electrical generator in accordance with claim 1 wherein:
the variable reluctance generator and the permanent magnet generator have separate stator windings.

15. A hybrid electrical generator in accordance with claim 2 wherein:
the variable reluctance generator and the permanent magnet generator have common stator windings.

16. A hybrid electrical generator in accordance with claim 2 wherein:
the variable reluctance generator and the permanent magnet generator have separated stator windings.

17. A hybrid electrical generator in accordance with claim 3 wherein:
the variable reluctance generator and the permanent magnet generator have common stator windings.

18. A hybrid electrical generator in accordance with claim 3 wherein:
the variable reluctance generator and the permanent magnet generator have separated stator windings.

19. A hybrid electrical generator in accordance with claim 4 wherein:
the variable reluctance generator and the permanent magnet generator have common stator windings.

20. A hybrid electrical generator in accordance with claim 4 wherein:
the variable reluctance generator and the permanent magnet generator have separated stator windings.

21. A hybrid electrical generator in accordance with claim 5 wherein:
the variable reluctance generator and the permanent magnet generator have common stator windings.

22. A hybrid electrical generator in accordance with claim 5 wherein:
the variable reluctance generator and the permanent magnet generator have separated stator windings.

23. A hybrid electrical generator in accordance with claim 1 further comprising:
a rectifier bridge, coupled to the combined output voltages of the generators, for providing a rectified DC output voltage.

24. A hybrid electrical generator in accordance with claim 1 further comprising:
a first rectifier bridge coupled to the output voltage of the variable reluctance generator for producing a first rectified output voltage;
a second rectifier bridge coupled to the output voltage of the permanent magnet generator for producing a second rectified output voltage; and
means for adding the first and second rectified voltages together to produce the regulated output voltage.

25. A hybrid electrical generator in accordance with claim 13 wherein:
the common stator windings are distributed.

26. A hybrid generator in accordance with claim 13 wherein:
the common stator windings are not distributed.

* * * * *